US008576197B2

(12) United States Patent
Crandall et al.

(10) Patent No.: US 8,576,197 B2
(45) Date of Patent: Nov. 5, 2013

(54) NOISE BLANKING FOR CAPACITIVE TOUCH DISPLAYS

(75) Inventors: Kenneth Crandall, Sunnyvale, CA (US); Michael Brosnan, Fremont, CA (US); Sam Sen Li, Santa Cruz, CA (US)

(73) Assignee: Pixart Imaging, Inc., Hsin-Chu (TW)

( * ) Notice: Subject to any disclaimer, the term of this patent is extended or adjusted under 35 U.S.C. 154(b) by 260 days.

(21) Appl. No.: 13/108,875

(22) Filed: May 16, 2011

(65) Prior Publication Data

US 2012/0293445 A1    Nov. 22, 2012

(51) Int. Cl.
*G06F 3/045* (2006.01)
(52) U.S. Cl.
USPC ......................................................... 345/174
(58) Field of Classification Search
None
See application file for complete search history.

(56) References Cited

U.S. PATENT DOCUMENTS

| | | | | |
|---|---|---|---|---|
| 5,859,392 | A | * | 1/1999 | Petty ........................... 178/18.01 |
| 7,511,711 | B2 | * | 3/2009 | Ing et al. ....................... 345/424 |
| 2003/0206162 | A1 | | 11/2003 | Roberts |
| 2006/0214921 | A1 | | 9/2006 | Takahashi et al. |
| 2006/0227115 | A1 | | 10/2006 | Fry |
| 2008/0007529 | A1 | | 1/2008 | Paun et al. |
| 2012/0287077 | A1 | * | 11/2012 | Pant et al. ...................... 345/174 |

FOREIGN PATENT DOCUMENTS

WO    WO 2010/048328    4/2010

* cited by examiner

*Primary Examiner* — Joseph Haley
*Assistant Examiner* — Emily Frank
(74) *Attorney, Agent, or Firm* — McClure, Qualey & Rodack, LLP (57) ABSTRACT

Disclosed are various embodiments of a capacitive touchscreen or touch panel system comprising a controller operably connected to a first plurality of drive electrodes and a second plurality of sense electrodes. The controller includes a noise disruption detector circuit, a user noise source detector/anticipator circuit, clock control logic circuitry operably connected to the noise disruption detector circuit and to the user noise source detector/anticipator circuit, at least one static-clocked digital filter circuit operably connected to and controlled by the clock control logic circuitry, a central processing unit (CPU) operably connected to the clock control logic circuitry, firmware operably connected to the CPU; and touch position circuitry configured to deliver signals indicative of touch positions on the touchscreen to a host controller. The controller is configured to employ at least one of the CPU and the firmware to cause the clock control logic circuitry to inhibit operation of the digital filter circuit in response to a signal representative of excessive noise levels being provided by either the noise disruption detector circuit or the user noise source detector/anticipator circuit.

24 Claims, 6 Drawing Sheets

NOISE BLANKING FOR CAPACITIVE TOUCH DISPLAYS

FIELD OF THE INVENTION

Various embodiments of the invention described herein relate to the field of touchscreen or touchpad systems, devices, components and methods configured to detect touches on a touchscreen or touch panel using capacitive sensing techniques, and to provide digitized output signals indicative of such touch positions.

BACKGROUND

Controllers for touchscreen devices send the position-dependent signals generated by the touchscreens to analog to digital converters (ADCs) to be digitized before further processing, including digital filtering, is carried out, to extract the positional information of interest. Touchscreen devices are often operated in environments where large amplitude pulses or bursts of RF noise may be encountered. Such impulsive RF noise events may be periodic or aperiodic, with switching power supplies or fluorescent lighting systems being examples of possible sources of the periodic type, and cell phone transmission events being possible sources of the aperiodic type. In some cases, the noise may be to some extent predictable.

When the linear digital filters normally present in the circuitry that processes the digitized signals encounter impulsive noise, the filters typically respond by "ringing". This response may disrupt normal operation for the duration of the ringing, by masking underlying touch signals, and/or by providing signals indicating non-existent i.e. false touches. Either outcome is clearly undesirable for the user.

What is needed is a touchscreen system, and method of operating such a system, that can detect or accurately predict the occurrence of impulsive noise bursts, prevent the filter ringing that would occur if such noise were processed by the digital filters of that system, and return the system to normal operation in as short a time as possible, so that accurate touch tracking is resumed.

SUMMARY

According to one embodiment, there is provided a capacitive touchscreen or touch panel system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto, drive circuitry operably connected to the first plurality of drive electrodes, sense circuitry operably connected to the second plurality of sense electrodes and configured to sense input signals therefrom, and a controller operably connected to the first plurality of drive electrodes and the second plurality of sense electrodes, the controller comprising a noise disruption detector circuit, a user noise source detector/anticipator circuit, clock control logic circuitry operably connected to the noise disruption detector circuit and to the user noise source detector/anticipator circuit, at least one static-clocked digital filter circuit operably connected to and controlled by the clock control logic circuitry, a central processing unit (CPU) operably connected to the clock control logic circuitry, firmware operably connected to the CPU, and touch position circuitry configured to deliver signals indicative of touch positions on the touchscreen to a host controller, wherein the controller is configured to employ at least one of the CPU and the firmware to configure the clock control logic circuitry to inhibit operation of the digital filter circuit in response to a signal representative of excessive noise levels being provided by either the noise disruption detector circuit or the user noise source detector/anticipator circuit.

According to another embodiment, there is provided a method of operating a capacitive touchscreen or touch panel system comprising a touchscreen, the touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto, drive circuitry operably connected to the first plurality of drive electrodes, sense circuitry operably connected to the second plurality of sense electrodes and configured to sense input signals therefrom, and a controller operably connected to the first plurality of drive electrodes and the second plurality of sense electrodes, the controller comprising a noise disruption detector circuit, a user noise source detector/anticipator circuit, clock control logic circuitry operably connected to the noise disruption detector circuit and to the user noise source detector/anticipator circuit, at least one static-clocked digital filter circuit operably connected to and controlled by the clock control logic circuitry, a central processing unit (CPU) operably connected to the clock control logic circuitry, firmware operably connected to the CPU, and touch position circuitry configured to deliver signals indicative of touch positions on the touchscreen to a host controller, wherein the controller is configured to employ at least one of the CPU and the firmware to configure the clock control logic circuitry to inhibit operation of the digital filter circuit in response to a signal representative of excessive noise levels being provided by either the noise disruption detector circuit or the user noise source detector/anticipator circuit, the method comprising causing the clocked control logic circuitry to inhibit operation of the digital filter circuitry in response to the excessive noise signal being provided.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
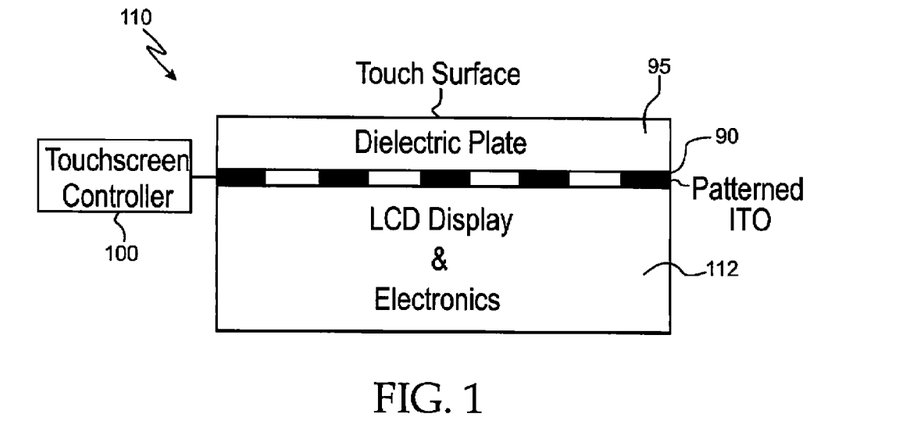
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath touchscreen 90.

Figure 2:
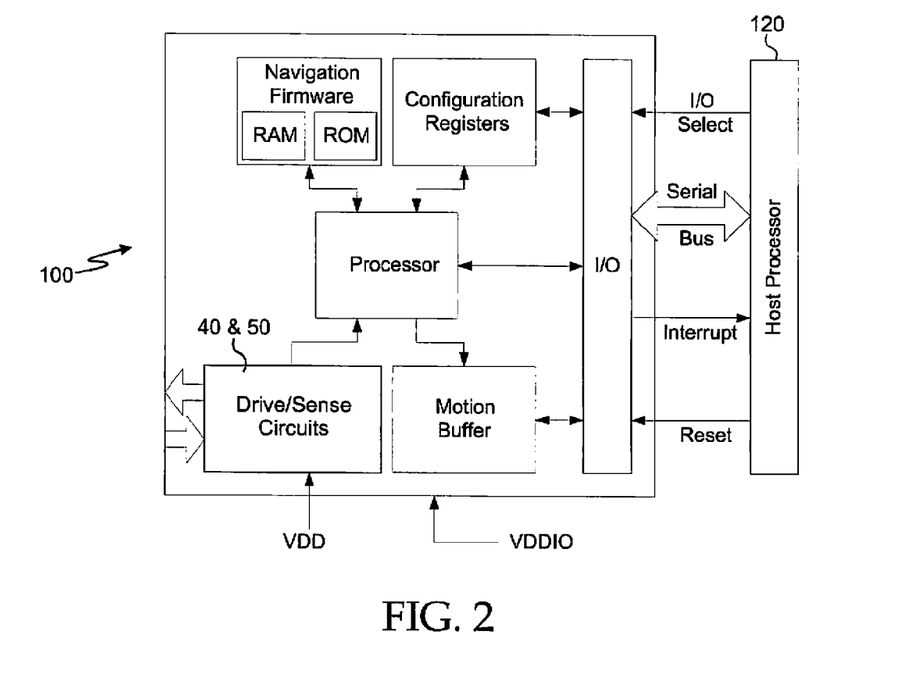
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000 ASIC or chip 100 modified in accordance with the teachings presented herein. In one embodiment, touchscreen controller is a low-power capacitive touch-panel controller designed to provide a touchscreen system with high-accuracy, on-screen navigation.

Figure 3:
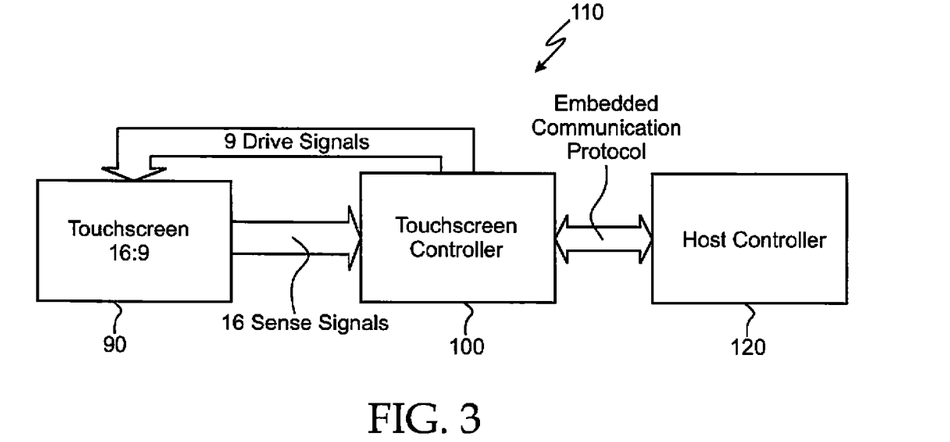
FIG. 3 shows one embodiment of a block diagram of a capacitive touchscreen system and a host controller.
Figure 4:
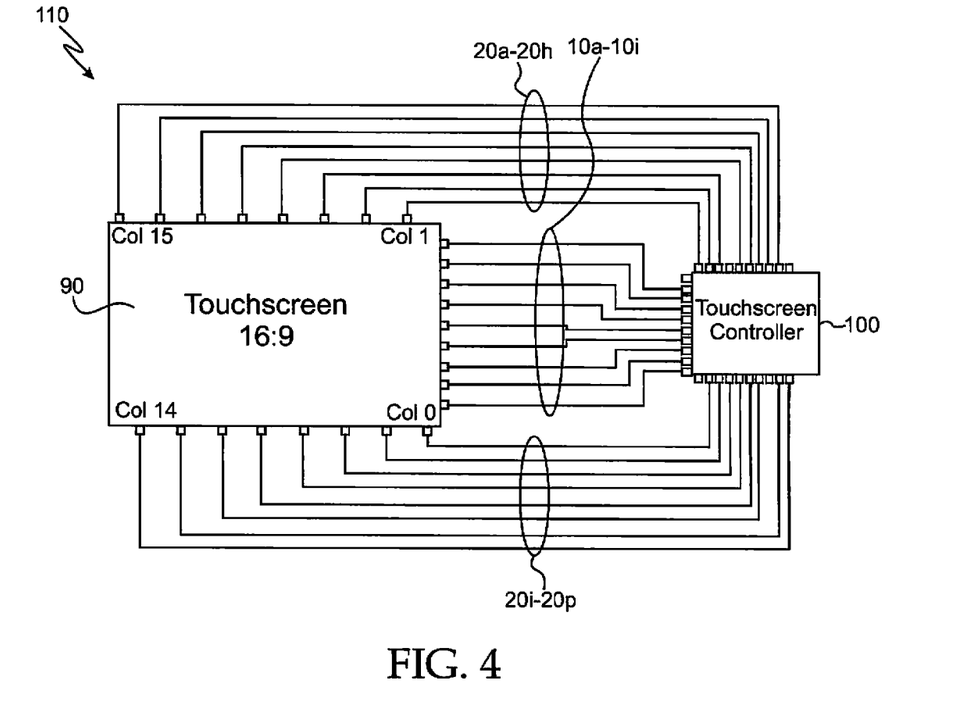
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 9 drive signal lines and 16 sense lines connected to an ITO grid on a touchscreen. Touchscreen controller 100 applies an excitation such as a square wave, meander signal or other suitable type of drive signal to the drive electrodes that may have a frequency selected from a range between about 40 kHz and about 300 kHz. The AC signal is coupled to the sense lines via mutual capacitance. Touching touchscreen or touch panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 9×16 and 12×20 arrays.

Touchscreen controller 100 may feature multiple operating modes with varying levels of power consumption. For example, in rest mode controller 100 may periodically look for touches at a rate programmed by the rest rate registers. There are multiple rest modes, each with successively lower power consumption.

In the absence of a touch for a certain interval controller 100 may automatically shift to the next-lowest power consumption mode. However, as power consumption is reduced the response time to touches may increase.

According to one embodiment, and as shown in FIG. 4, an ITO grid or other electrode configuration on touchscreen 90 comprises sense columns $20a$-$20p$ and drive rows $10a$-$10i$, where sense columns $20a$-$20p$ are operably connected to corresponding sense circuits and rows $10a$-$10i$ are operably connected to corresponding drive circuits. One configuration for routing ITO or other lines from drive and sense electrodes to lines to touchscreen controller 100 is shown in FIG. 4.

Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

Figure 5:
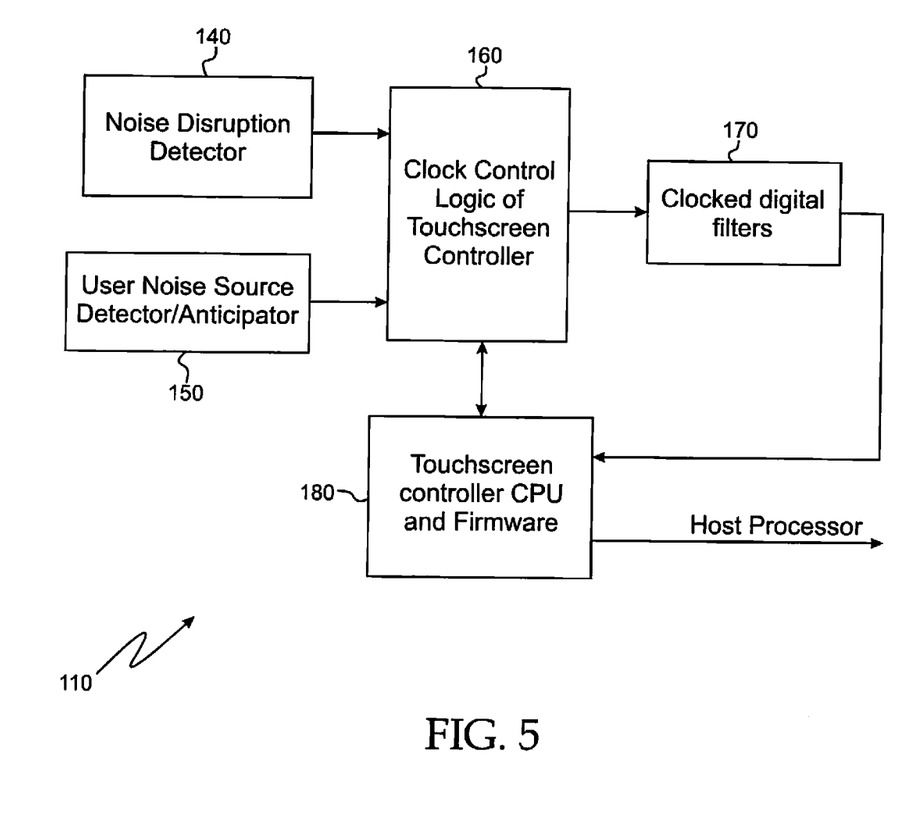
FIG. 5 shows a schematic block diagram of one embodiment of a touchscreen system including noise blanking.

FIG. 5 shows a schematic diagram of one embodiment of touchscreen system 110 designed to reduce the disruptive effect of noise impulses by causing digital filters to ignore inputs during an identified blanking interval, and only resume their filtering operation when the blanking interval has passed. The manner in which this is achieved may be understood with reference to the five blocks shown in the figure: noise disruption detector 140, user noise source detector/anticipator 150, clock control logic 160, static clocked digital filters 170, and touchscreen controller CPU and associated firmware 180.

Noise disruption detector 140 can either be incorporated in the circuitry of touchscreen controller 100, or be externally implemented in other circuits. The detector detects the presence of impulsive noise signals, alerting controller 100 to take preventative measures as discussed below. 140 could, for example, be an RF envelope detector that senses strong, short duration RF energy. Such energy can couple into the capacitive touch panel, typically causing disruption of normal navigation functions.

User noise source detector/anticipator 150 anticipates the generation of impulsive noise signals. Detector/anticipator 150 may, for example, be part of a transmission system that is known to generate RF, and hence, can warn touch controller 110 of an impending noise disturbance, and initiate preventive measures as discussed below.

Elements 140 and 150 provide a blanking signal to clock control logic 160 to indicate the presence or anticipated presence respectively of impulsive noise. Clock control logic 160 operates in one of two configurable modes to control the clocking of static clocked digital filters 170. In normal operation, these filters are used in the processing of the digitized signals indicative of the touch positions being tracked by system 110.

In one clocking mode, the "Blank on Signal" mode, digital filters 170 are prevented from being clocked whenever the blanking signal is present. This mode is totally asynchronous to the navigation process firmware included in controller 100, and hence, this mode may run without firmware intervention.

In another clocking mode, the "Blank on Flag" mode, digital filters 170 are prevented from being clocked whenever a blanking flag flip-flop (not shown) is set. This flip-flop is set by the blanking signal and is normally cleared by firmware. The firmware monitors this flag and coordinates clearing the flag with on-going navigation functions.

Static clocked digital filters 170 have their clock inputs gated. The filters may include median filters, FIR filters, IIR filters, and ALC servo-loops for gain tracking. The important characteristic of all these filters is that they "freeze" in state when they are not clocked, resuming their normal filtering operations when the blanking signal is cleared. Hence, filters 170 can be held statically, in the state they were in prior to the provision of the blanking signal, for a duration corresponding to the desired blanking interval. This is the time interval during which the impulsive noise detected or anticipated would otherwise generate ringing. The filters resume their normal filtering operations on the digitized signals indicative of touch positions when the blanking signal is cleared.

The combination 180 of touch controller CPU and its associated firmware processes the digital filter outputs to determine appropriate touch navigation signals to send to the host processor.

Although the system represented in FIG. 5 will not track touch positions accurately and continuously through time, because of the blanking intervals, it is generally preferable for the tracked output signals to be frozen for short periods, indicating touch positions in the recent past, rather than for those signals to respond to impulsive noise, indicating completely erroneous touch positions.

Figure 6:
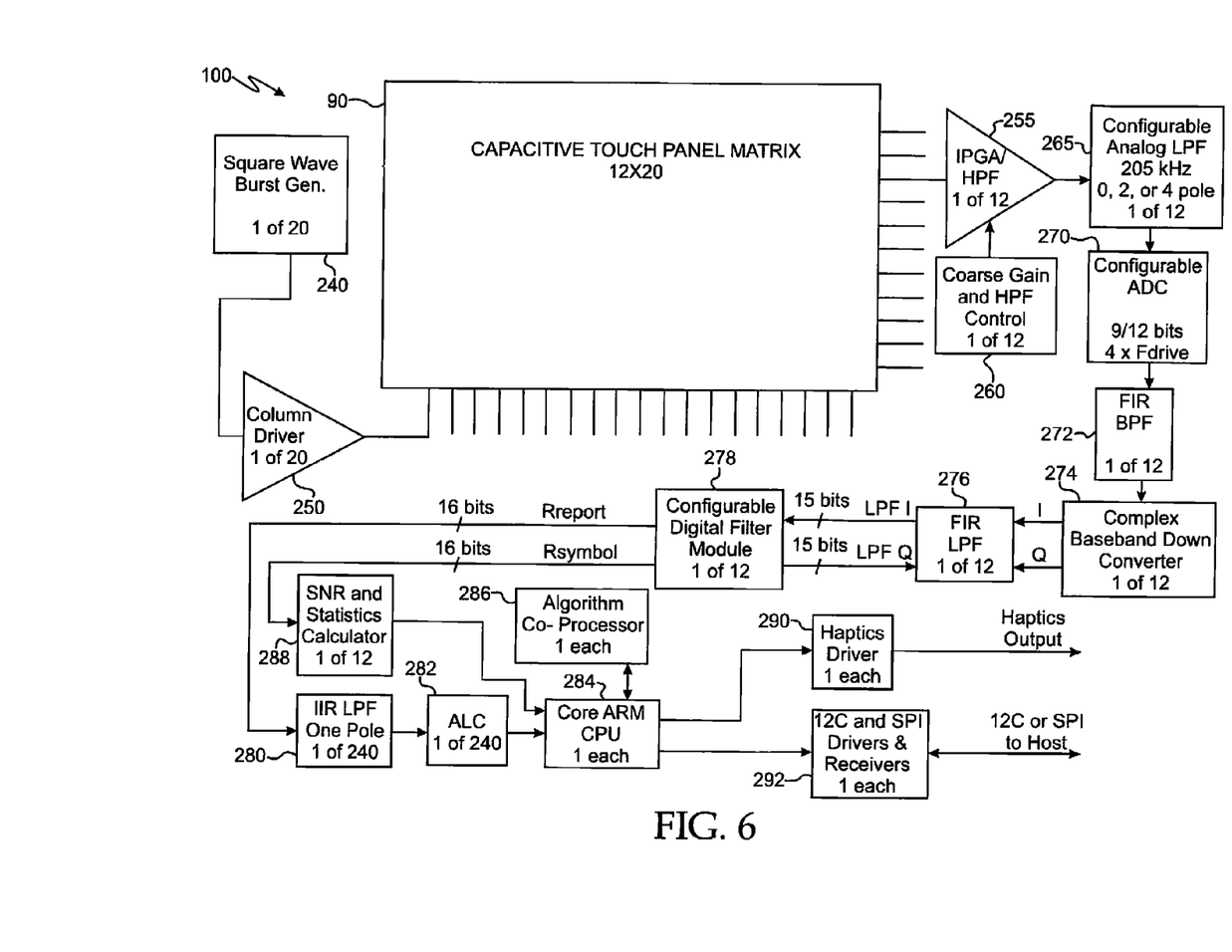
FIG. 6 shows a schematic block diagram of one embodiment of a touch screen controller that provides noise blanking.

FIG. 6 shows a schematic diagram of one embodiment of a touch screen controller ASIC 100 with a touchscreen or touch panel matrix 90 using 240 touch cell arranged in a grid of 12×20 individual cells.

A typical mutual-capacitance measurement technique senses capacitive changes on the touch panel matrix or touchscreen 90 by measuring the capacitive coupling between the driver signals, supplied by square wave burst generators 240 through column drivers 250, and the corresponding signals output from the sense interstitial pin grid array (IPGA) pins shown on the right hand side of touch panel matrix 90. It should be noted that although only one generator 240 and one driver 250 are shown explicitly in the figure, other configurations are also contemplated, such as one for each column or row of the array. The sensed signals are amplified and high pass filtered by amplifier elements 255 controlled by coarse gain and analog filter control elements 260. The gain-adjusted, high-pass-filtered signals are low-pass-filtered by analog filters 265, and then digitized by configurable ADCs 270 before they are filtered by FIR band pass filters 272 and down-converted by complex baseband down-converters 274. Down-converters 274 output parallel I and Q data streams, which are fed first into FIR low pass filters 276 and then into configurable digital filter modules 278. The modules may include firmware selectable 3 element median filters.

Outputs from configurable digital filer modules 278 are filtered by one pole IIR low pass filters 280 and leveled by passage through automatic level control circuits 282 before being input to ARM core processor 284. Outputs from the configurable digital filter modules 278 also pass to SNR and statistics calculator 288, and preferably employ a noise avoidance algorithm in support firmware to choose appropriate drive frequencies.

The output from calculator 288 is also fed into ARM core processor 284. Navigation-related processing is then carried out by the combination of ARM core processor 284 and algorithm coprocessor 286, providing haptic outputs from haptic driver 290 to host controller 120, and exchanging I2C or SPI data through I2C and SPI driver/receiver interface 292 with host controller 120.

It should be noted that although only one each of amplifier element 255, control element 260, low-pass filter 265, ADC 270, FIR BPF 272, down-converter 274, FIR low pass filter 276, digital filter module 278, IIR low pass filter 280, ALC 282 and calculator 284 are shown, other configurations of such components are contemplated, such as one set for each row or column of array 90.

Controller 100 may also include a general purpose input/output pin that is firmware configured as a blanking input. A logic "high" ("true") is applied to this input pin as a blanking signal. The blanking signal is provided by external circuits that either detect or generate energy that might disrupt proper touch controller operation.

The blanking signal sets a flip-flop (not shown) within the controller. This blanking flip-flop can be cleared in one of two firmware-selectable ways. The first way is self-clearing, in which the flip-flop clears when the blanking signal goes low ("false"). The second way is clearing under firmware control at some predetermined time after the blanking signal goes false. The choice of which method to use may depend on the duration and nature of the underlying disturbance that makes blanking desirable.

In either case, whenever the blanking flip-flop is set, the following actions are taken:
1. Filtering carried out by median 3 filters within configurable digital filter module 274 is inhibited
2. Filtering carried out by IIR LPF filters 280 is inhibited
3. ALC 282 functions are inhibited
4. Navigation (touch tracking) functions are inhibited.

All other digital filter functions performed before the signals to be processed encounter the controller elements directly listed in actions 1 to 4 above are unchanged in their clocking behavior. Any disturbance caused to these earlier-encountered processing stages by impulsive noise flushes through the system quickly, due to their relatively high bandwidth, and is consequently not noticeable to the user.

Figure 7:
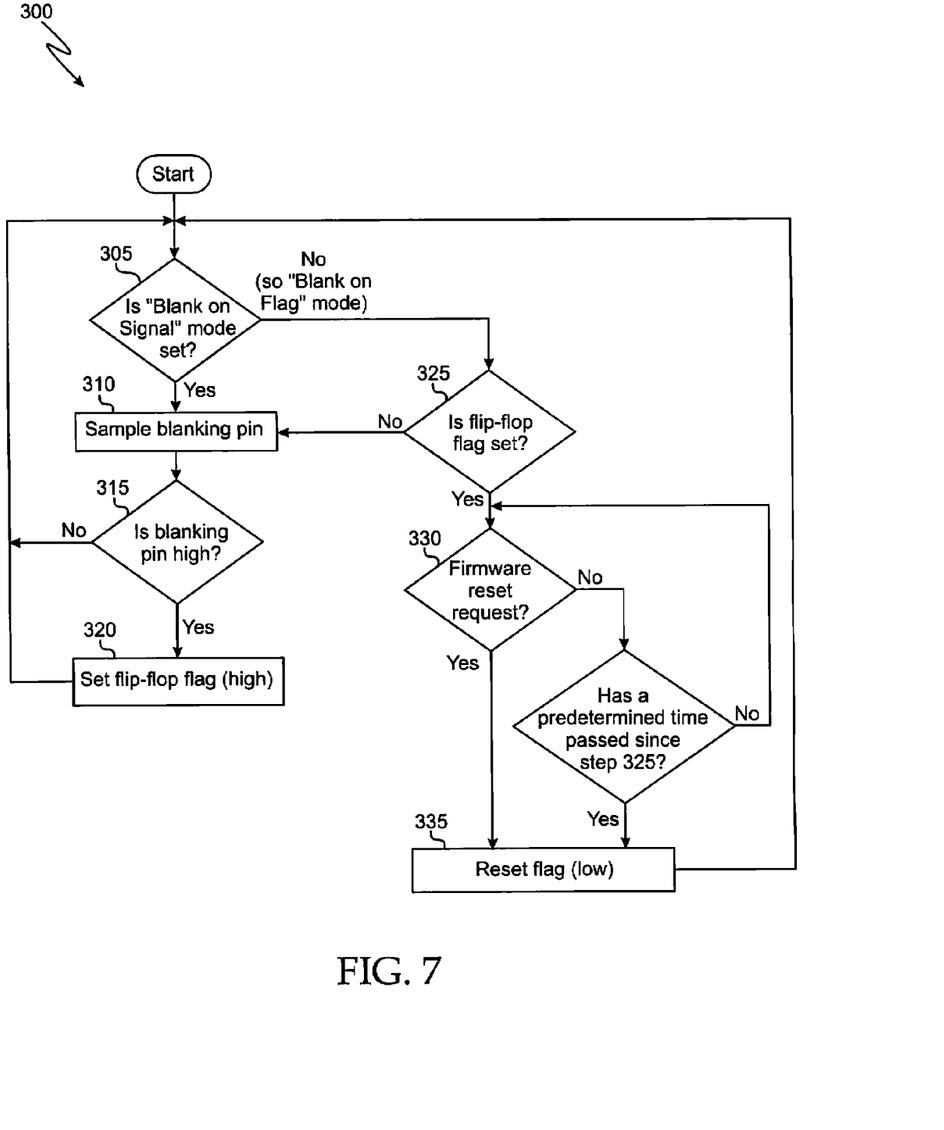
FIG. 7 shows a flowchart for one embodiment of a method for controlling a touchscreen system which includes noise blanking.

FIG. 7 shows one method 300 for controlling a touchscreen system employing noise blanking. Method 300 begins by determining at step 305 whether the blanking mode is "Blank on Signal".

If the method determines at step 305 that blanking mode "Blank on Signal" is in effect, the blanking pin of the controller is sampled at step 310, and the method determines at step 315 whether the blanking pin is active i.e. at a logical high. If the pin is high, the method sets the blanking flip-flop at step 320, and then returns to step 305 to determine the blanking mode, but if the pin is low, the method returns directly to step 305 to determine the blanking mode, without setting the flag.

If the method determines at step 305 that blanking mode "Blank on Signal" is not in effect, i.e. that "Blank on Flag" is in effect, the method determines at step 325 whether the blanking flip flop flag has been set. If the flag has not been set, the method goes to step 310 to sample the blanking pin, but if the flag has been set, the method determines at step 330 whether a firmware request to reset the flag has been received. If such a request has been received, the flip-flop is reset at step 335 and the method returns to step 305 to determine the blanking mode. If such request has not been received, the method determines at step 335 if a predetermined time interval has passed since step 325 was last performed. If that predetermined time interval has passed, the flip-flop is reset at step 335 and the method returns to step 305. If that time interval has not passed, the method returns to step 330.

Figure 8:
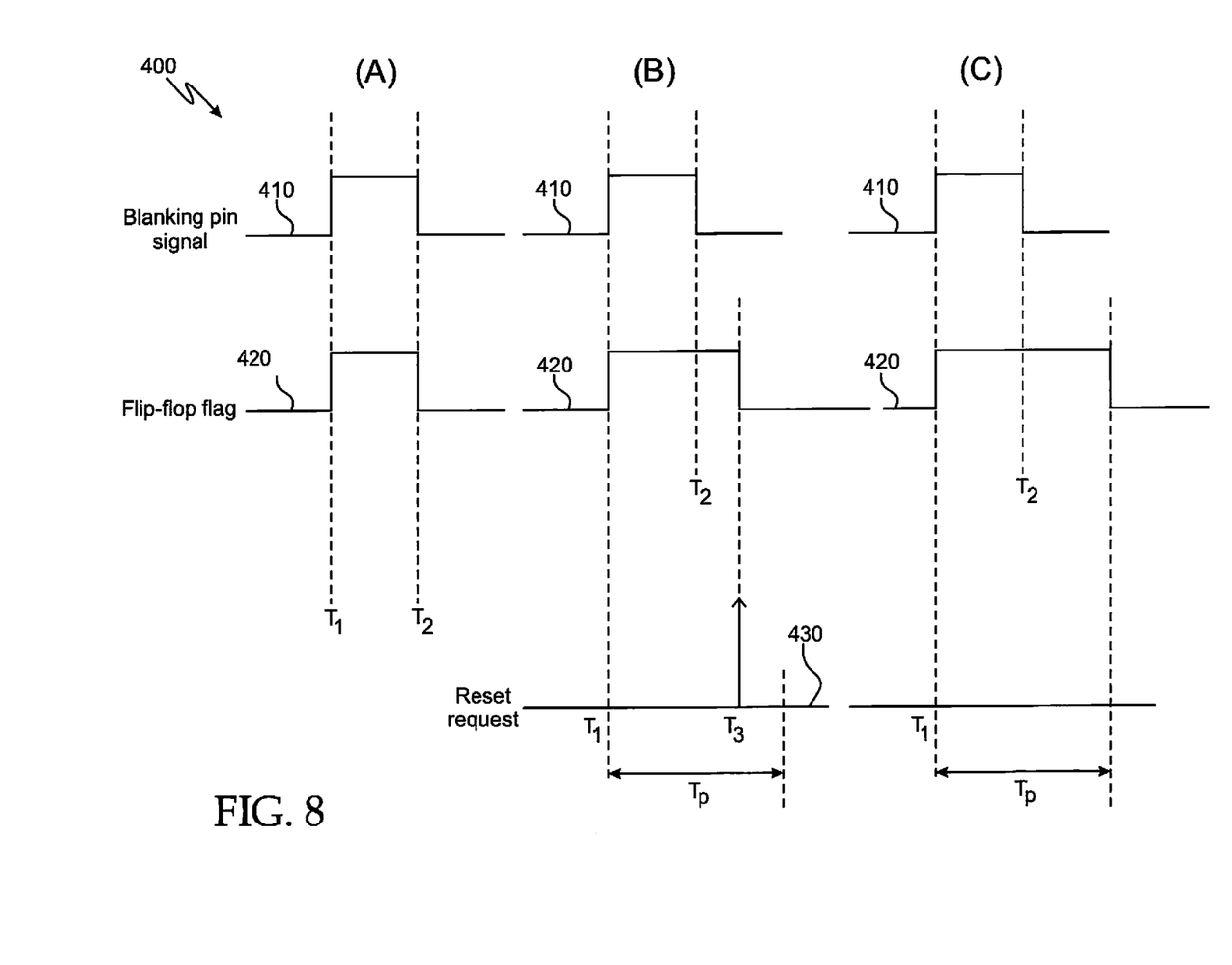
FIG. 8 shows timing diagrams for blanking pin, flip-flop flag, and firmware reset signals.

FIG. 8 shows timing diagrams 400 for blanking pin and flip-flop signals for case (A), when the system is operated in "Blank on Signal" mode, and for blanking pin, flip-flop, and firmware reset signals for cases (B) and (C), when the system is operated in "Blank on Flag mode". In case (B), a firmware reset request is received at where the interval between and is less than a predetermined time, and in case (C) no firmware reset request is received within the predetermined time. In case (A), trace 410 shows the signal on the blanking pin going high at time, due to detected or anticipated impulsive noise, and falling back to a low state at time when the noise ceases. The blanking flip-flop signal 420 follows the same pattern, being set at, and resetting at. In case (B), the blanking pin and flip-flop flag traces go high at time and the blanking signal goes low at as before, but the flip-flop flag stays high until a reset request (trace 430) is received, at which point the flag is reset low. In case (C), the blanking pin and flip-flop flag traces go high at time and the blanking signal goes low at as before, but as trace 430 shows, no reset request is received within a predetermined time interval, and the flag is only reset at the end of that interval.

Note that much of the circuitry and many of the components, elements, devices and methods disclosed herein are employed in the Avago Technologies® AMRI-5200 touchscreen controller. A Preliminary Product Data Sheet for the AMRI-5200 touchscreen controller dated Apr. 20, 2011 and entitled "AMRI-5200 Low-Power 10-Touch Controller," filed on even date herewith in a corresponding Information Disclosure Statement and corresponding USPTO Form 1449, is hereby incorporated by reference herein in its entirety.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

We claim:

1. A capacitive touchscreen or touch panel system, comprising:
   a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto;
   drive circuitry operably connected to the first plurality of drive electrodes;
   sense circuitry operably connected to the second plurality of sense electrodes and configured to sense input signals therefrom, and
   a controller operably connected to the first plurality of drive electrodes and the second plurality of sense electrodes, the controller comprising:
   a noise disruption detector circuit;
   a user noise source detector/anticipator circuit;
   clock control logic circuitry operably connected to the noise disruption detector circuit and to the user noise source detector/anticipator circuit;
   at least one static-clocked digital filter circuit operably connected to and controlled by the clock control logic circuitry;
   a central processing unit (CPU) operably connected to the clock control logic circuitry;
   firmware operably connected to the CPU; and
   touch position circuitry configured to deliver signals indicative of touch positions on the touchscreen to a host controller;
   wherein the controller is configured to employ at least one of the CPU and the firmware to cause the clock control logic circuitry to inhibit operation of the digital filter circuit in response to a signal representative of excessive noise levels being provided by either the noise disruption detector circuit or the user noise source detector/anticipator circuit.

2. The touchscreen or touch panel system of claim 1, wherein in response to the excessive noise level signal being provided operation of the touch position circuitry is additionally inhibited.

3. The touchscreen or touch panel system of claim 1, wherein the noise disruption detector circuitry is configured to provide a blanking signal on a pin of the controller when such circuitry detects impulsive RF noise exceeding a predetermined threshold.

4. The touchscreen or touch panel system of claim 3, wherein a flip-flop flag in the clock control logic circuitry is set if the blanking signal on the pin of the controller is set.

5. The touchscreen or touch panel system of claim 1, wherein the noise disruption detector circuitry comprises an RF envelope detector.

6. The touchscreen or touch panel system of claim 1, wherein the user noise source detector/anticipator circuitry is configured to provide a blanking signal on a pin of the controller if such circuitry detects impulsive RF noise exceeding a predetermined threshold.

7. The touchscreen or touch panel system of claim 6, wherein a flip-flop flag in the clock control logic circuitry is set if the blanking signal on the pin of the controller is set.

8. The touchscreen or touch panel system of claim 1, wherein the digital filter circuitry is configured to freeze when not clocked by the clock control logic circuitry and to maintain a static state until clocked by the clock control logic circuitry.

9. The touchscreen or touch panel system of claim 1, wherein the digital filter circuitry comprises one of median filter circuitry, FIR filter circuitry, IIR filter circuitry, and ALC servo-loop circuitry.

10. The touchscreen or touch panel system of claim 1, wherein either the noise disruption detector circuitry or the user noise detector/anticipator circuitry provides a blanking signal on a pin of the controller if impulsive RF noise exceeding a predetermined threshold is detected.

11. The touchscreen or touch panel system of claim 10, wherein the blanking signal sets a blanking flip-flop flag in the clock control logic circuitry.

12. The touchscreen or touch panel system of claim 11, wherein the clock control logic circuitry is configured to operate in a first mode according to which the digital filter circuitry is inhibited from being clocked if the blanking signal is present and the digital filter circuitry is clocked if the blanking signal is not present.

13. The touchscreen or touch panel system of claim 12, wherein the clock control logic circuitry is further configured to operate in a second mode according to which the digital filter circuitry is inhibited from being clocked if the blanking flip-flop flag is set and the digital filter circuitry is clocked if the blanking flip-flop flag is not set.

14. The touchscreen or touch panel system of claim 13, wherein in the second mode the flip-flop flag is configured to be reset by a firmware reset request signal.

15. The touchscreen or touch panel system of claim 13, wherein in the second mode the flip-flop flag is configured to be reset after being in the set state for a predetermined time interval.

16. A method of operating a capacitive touchscreen or touch panel system comprising a touchscreen, the touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto, drive circuitry operably connected to the first plurality of drive electrodes, sense circuitry operably connected to the second plurality of sense electrodes and configured to sense input signals therefrom, and a controller operably connected to the first plurality of drive electrodes and the second plurality of sense electrodes, the controller comprising a noise disruption detector circuit, a user noise source detector/anticipator circuit, clock control logic circuitry operably connected to the noise disruption detector circuit and to the user noise source detector/anticipator circuit, at least one static-clocked digital filter circuit operably connected to and controlled by the clock control logic circuitry, a central processing unit (CPU) operably connected to the clock control logic circuitry, firmware operably connected to the CPU, and touch position circuitry configured to deliver signals indicative of touch positions on the touchscreen to a host controller, wherein the controller is configured to employ at least one of the CPU and the firmware to cause the clock control logic circuitry to inhibit operation of the digital filter circuit in response to a signal representative of excessive noise levels being provided by either the noise disruption detector circuit or the user noise source detector/anticipator circuit, the method comprising causing the clocked control logic circuitry to inhibit operation of the digital filter circuitry in response to the excessive noise signal being provided.

17. The method of claim 16, further comprising, in response to the excessive noise signal being signal provided, inhibiting operation of the touch position circuitry.

18. The method of claim 16, further comprising providing a blanking signal on a pin of the controller when the noise disruption detector circuit detects impulsive RF noise exceeding a predetermined threshold.

19. The method of claim 18, further comprising setting a flip-flop flag in the clock control logic circuitry when the blanking signal is present on the pin of the controller.

20. The method of claim 16, wherein the noise disruption detector is an RF envelope detector.

21. The method of claim 16, further comprising providing a blanking signal on a pin of the controller when the noise disruption detector detects impulsive RF noise exceeding a predetermined threshold.

22. The method of claim 21, further comprising setting a flip-flop flag in the clock control logic circuitry when the blanking signal on the pin of the controller is set.

23. The method of claim 16, wherein the digital filter circuitry freezes when not clocked by the clock control logic circuitry and maintains a static state until clocked by the clock control logic circuitry.

24. The method of claim 16, wherein the digital filter circuitry is one of median filter circuitry, FIR filter circuitry, IIR filter circuitry, and ALC servo-loop circuitry.

* * * * *